United States Patent
Ullmann et al.

(10) Patent No.: US 6,623,090 B2
(45) Date of Patent: Sep. 23, 2003

(54) METHOD AND DEVICE FOR DETECTING A PANIC BRAKING OPERATION

(75) Inventors: Steffen Ullmann, Stuttgart (DE); Ruediger Poggenburg, Vaihingen/enz (DE); Thomas Opferkuch, Mailand (DE); Stefan Diehle, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 09/897,009

(22) Filed: Jul. 2, 2001

(65) Prior Publication Data

US 2002/0027389 A1 Mar. 7, 2002

(30) Foreign Application Priority Data

Sep. 7, 2000 (DE) .......................................... 100 44 121
Jun. 30, 2000 (DE) .......................................... 100 31 125

(51) Int. Cl.$^7$ ................................................ B60G 5/00
(52) U.S. Cl. ...................... 303/155; 303/178; 303/186; 303/196; 188/DIG. 1; 701/70
(58) Field of Search ................................ 303/155, 177, 303/178, 167, 174, 168, 183, 195, 196, 113.5, 186; 188/DIG. 1; 701/79, 70

(56) References Cited

U.S. PATENT DOCUMENTS

| | | | | |
|---|---|---|---|---|
| 4,321,677 A | * | 3/1982 | Takahashi et al. | 188/DIG. 1 |
| 5,171,070 A | * | 12/1992 | Okazaki et al. | 303/176 |
| 5,480,217 A | * | 1/1996 | Ohtsu | 303/167 |
| 5,727,854 A | * | 3/1998 | Pueschel et al. | 303/155 |
| 6,023,221 A | * | 2/2000 | Michelotti | 340/471 |
| 6,212,461 B1 | * | 4/2001 | Ghoneim et al. | 303/191 |

FOREIGN PATENT DOCUMENTS

| | | | |
|---|---|---|---|
| DE | 4129878 A1 | * | 3/1992 |
| DE | 195 24 939 | | 1/1997 |

* cited by examiner

*Primary Examiner*—Jack Lavinder
*Assistant Examiner*—Mariano Sy
(74) *Attorney, Agent, or Firm*—Kenyon & Kenyon

(57) ABSTRACT

A panic braking operation of a vehicle having at least two wheels is detected by measuring speed quantities which represent the rotary motions of at least two wheels, selecting the speed quantity of one of the wheels and/or by determining a speed value from the speed quantities, determining a change value which represents the time-related change of the selected speed quantity and/or of the speed value, determining the time characteristic of the change value, and detecting a panic braking operation as a function of the time characteristic of the change value. What is advantageous here is that no complex and expensive additional sensor technology is needed for detecting panic braking; the wheel-speed sensors which are provided anyway in anti-lock control systems, traction control systems, and/or vehicle stability control systems are sufficient. Thus, the use of a panic detection is also possible in so-called "low-cost braking systems".

19 Claims, 3 Drawing Sheets

METHOD AND DEVICE FOR DETECTING A PANIC BRAKING OPERATION

FIELD OF THE INVENTION

The present invention relates to a method and a device for detecting a panic braking operation.

BACKGROUND INFORMATION

It is generally understood by "panic braking" that the driver of the vehicle actuates the brake pedal quickly and heavily. Systems for detecting a panic braking operation are known from the related art. Thus, German Published Patent Application No. 195 24 939, for example, describes a control system for a braking system in which in specific operating situations which are detected on the basis of the driver's braking command, braking force exceeding the actual input from the driver is applied to the wheel brake. One of these operating situations is a situation in which a danger situation can be inferred from the driver's response (panic braking). To detect this situation, the manner in which the driver actuates the brake actuating element is evaluated. If he/she actuates the element very quickly, which is detected, for example, on the basis of the change in the admission pressure of the braking system, pressure is built up beyond the driver's input. If the evaluated quantity exceeds a predetermined threshold value (trigger threshold), then the automatic braking process, that is to say the increased braking force build-up takes place. In this context, the trigger threshold is changed on the basis of preselected performance quantities, the trigger threshold being lowered, that is the triggering of the increased braking force build-up is made more responsive when the danger potential increases. In this context, the admission pressure of the braking system, the vehicular speed, the vehicle's rate of rotation, the transversal acceleration of the vehicle, the longitudinal acceleration of the vehicle, the steering-angle change, the engine power output and/or the brake-pressure request of a driving-dynamics controller are mentioned as performance quantities.

To detect a panic braking operation, such systems known from the related art need a relatively complex and thus expensive additional sensor technology such as brake pedal travel pickups, longitudinal acceleration sensors or yaw-rate sensors.

SUMMARY OF THE INVENTION

According to the present invention, a panic braking operation of a vehicle having at least two wheels is detected by
- measuring speed quantities which represent the rotary motions of at least two wheels,
- selecting the speed quantity of one of the wheels and/or by determining a speed value from the speed quantities,
- determining a change value which represents the time-related change of the selected speed quantity and/or of the speed value,
- determining the time characteristic of the change value,
- detecting a panic braking operation as a function of the time characteristic of the change value.

The present invention has the advantage that no complex and expensive additional sensor technology is needed for detecting panic braking; the wheel-speed sensors which are provided anyway in anti-lock control systems, traction control systems, and/or vehicle stability control systems are sufficient. Thus, the use of a panic detection is also possible in so-called "low-cost braking systems".

Through the detection of a panic braking operation, it is possible to warn the following traffic in the event of a panic braking operation. Here, for example, one is thinking of activating the hazard warning system in response to a detected panic braking operation.

Moreover, provision can be made for the detection of a panic braking operation to be communicated via ranging systems (ACC systems, Automatic Cruise Control) so that vehicles that follow are heavily braked as well.

When detecting a panic braking operation, stability can be improved by carrying out a responsive initial control of the brake pressures at the wheels of the rear axle and/or of the front axle. In this manner, one avoids excessive wheel run-ins, accompanied by wheel instabilities.

Furthermore, provision can be made to limit the brake pressure at the rear wheels in response to a detected panic braking operation. This limitation can be maintained until an anti-lock control and/or a braking-force distribution control is activated at the rear wheels or a specifiable second period of time is exceeded or a specifiable minimum vehicle deceleration is undershot. Through this rate-of-change limitation of the pressure rise in the wheel brakes, an improvement of the braking distance is achieved since, with these elements, the excess brake pressure does not overly exceed the locking pressure level. Because of this, the following brake-pressure reduction can be kept small. Also, strong hydraulic throttling of the braking action at the wheel brakes of the rear axle, which results in an unsatisfactory brake pedal feel, can be reduced or eliminated.

In an advantageous refinement of the present invention, provision is made for the speed quantity of one of the wheels to be selected in such a manner that the speed quantity of the wheel having the lowest rotational speed is selected as the selected speed quantity. Thus, the slowest wheel is used as reference wheel. Alternatively or in addition to this, the speed value can be determined via a, possibly weighted, mean value generation from the speed quantities of at least two wheels.

Moreover, provision can be made for the speed quantities to be checked for errors, and for the speed quantities of the wheels at which an error has been detected to be excluded from the selection of the speed quantity and/or from the determination of the speed value.

It is also possible to detect whether the vehicle travels on a roadway having irregularities of a specifiable degree (rough-road detection). If such a rough road is present, the detection of the panic braking operation is deactivated.

Moreover, it is advantageous that only non driven wheels are used for selecting the selected speed quantity, that is the reference wheel, or for determining the speed value, respectively. In this manner, the influence of an engine drag torque, in particular on roadways having a low coefficient of friction, is ruled out.

The time characteristic of the change value as a function of which a panic braking operation is detected according to the present invention can be determined in such a manner that the change value, that is the negative wheel acceleration of the selected wheel, is compared to a first threshold value. A panic braking operation is detected if the change value further falls below a second threshold value within a specifiable first period of time subsequent to falling below the first threshold value. In this context, the first threshold value is greater than the second threshold value.

To make the detection of the panic braking operation more reliable, provision can be made for the actuation of the brake pedal to be detected via a braking signal. This can be done, for example, via the brake lights switch. In this embodiment, a panic braking operation is detected only if the braking signal indicates an actuation of the brake pedal.

Alternatively or in addition to this, provision can be made to determine a deceleration quantity which represents the deceleration of the whole vehicle. According to this embodiment, a panic braking operation is detected only if the deceleration quantity becomes greater over time.

DETAILED DESCRIPTION

Figure 1:
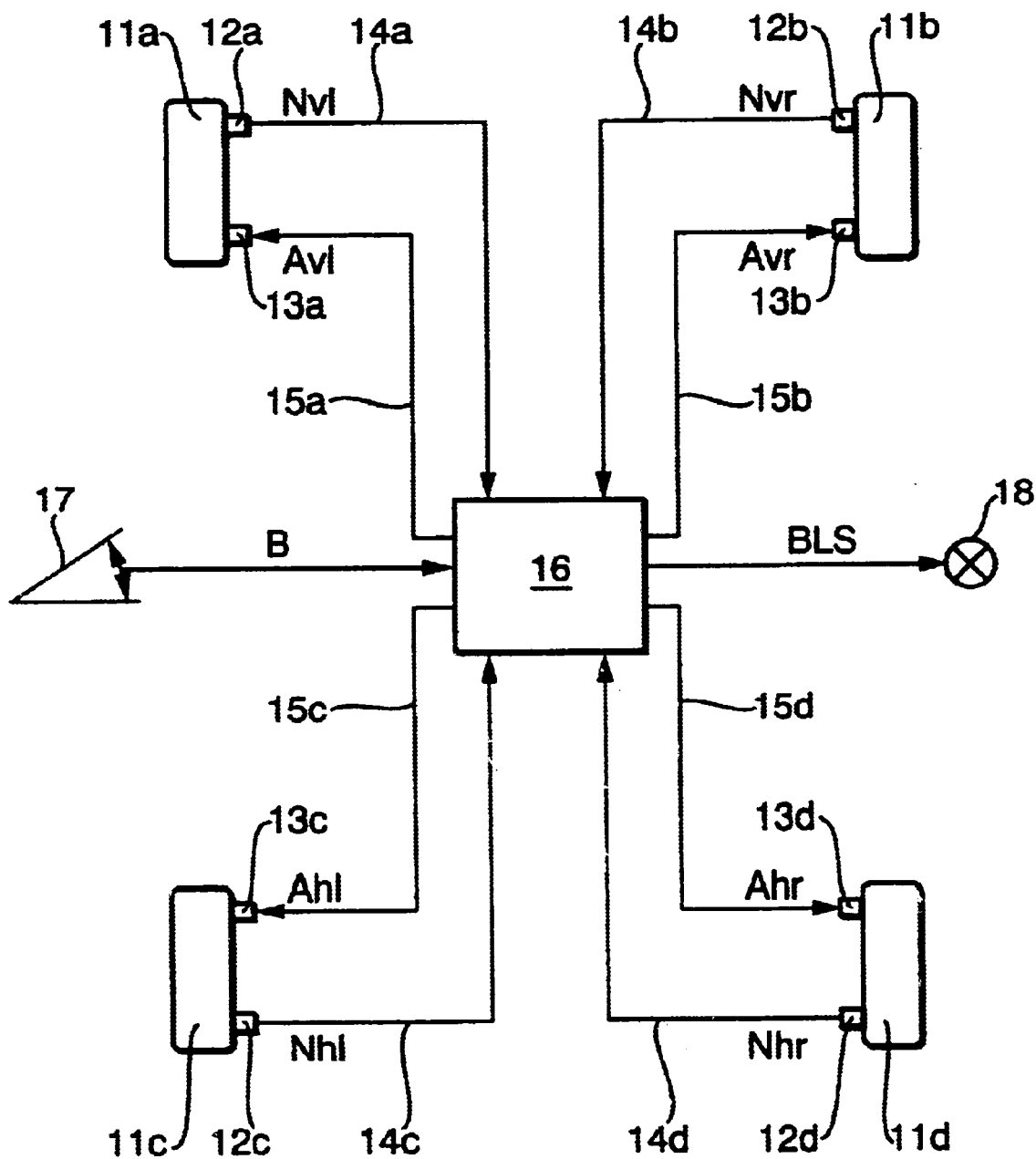
FIG. 1 schematically shows the braking system of a vehicle.

In the following, the present invention will be described on the basis of an exemplary embodiment. FIG. 1, via reference symbol 11a through d, shows four wheels of a two-axle vehicle, each wheel having a wheel-speed sensor denoted by reference symbol 12a through d. Wheel speeds Nij are fed to evaluation unit 16. In this context, index i denotes the association of the corresponding quantity with the front axle (i=v) or with the rear axle (i=h). Index j represents the association of the corresponding quantity with the right (j=r) or with the left (j=1) vehicle side.

Each wheel 11a through d is allocated wheel brakes 13a through d whose braking force, that is braking action is controlled by evaluation unit 16 via lines 15a through d. To this end, control signals Aij are used.

Reference symbol 17 represents the brake pedal which can be actuated by the driver. The position of brake pedal 17 is detected and fed to evaluation unit 16 as signal B. If a braking operation is present, brake lights 18 are controlled by signal BLS.

Figure 2:
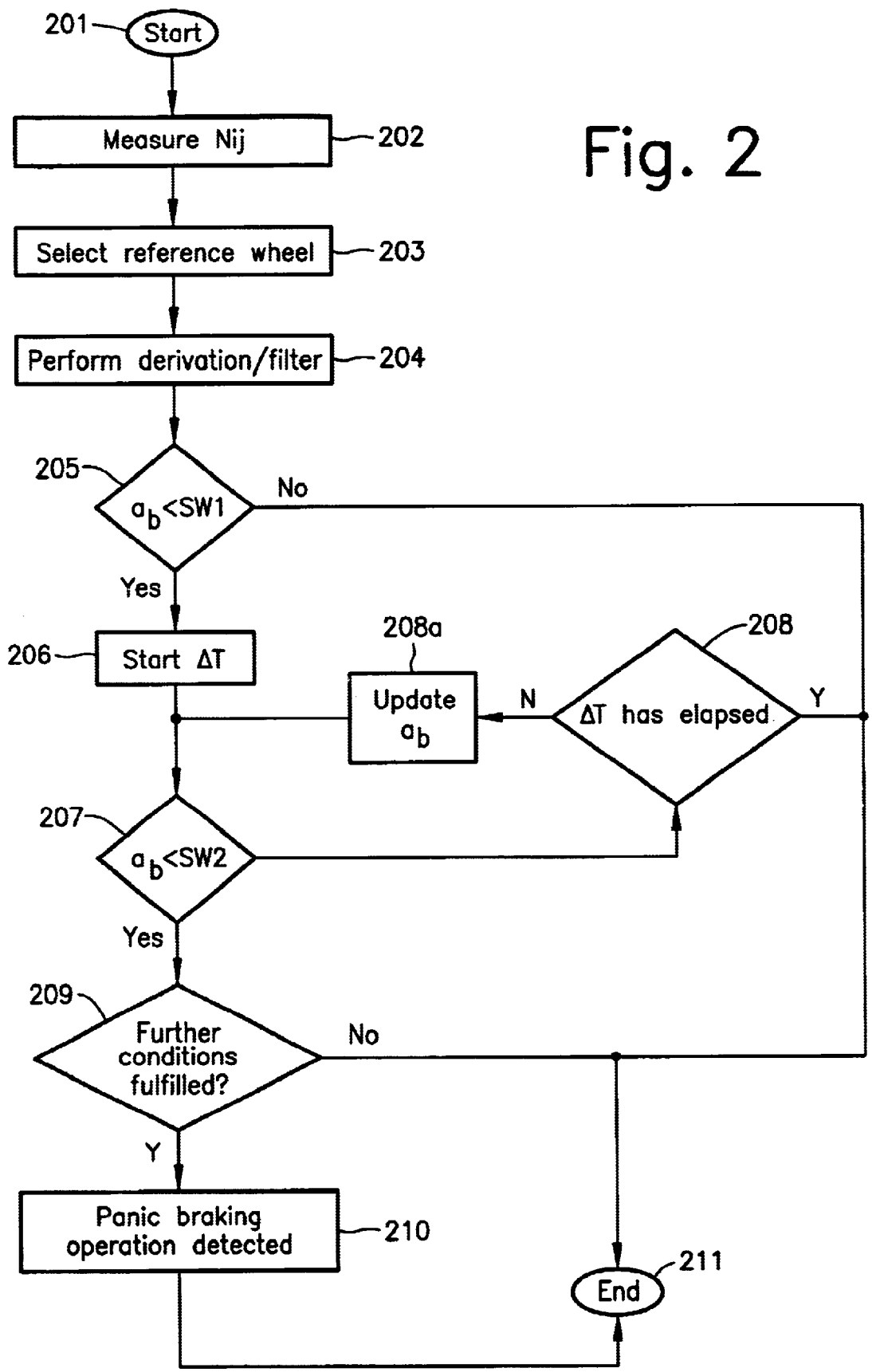
FIG. 2 depicts the exemplary embodiment on the basis of a flow chart.

According to the present invention, a sharp initial braking (quick and heavy actuation of brake pedal 17), that is a panic braking operation is detected on the basis of the wheel response. A corresponding flow chart is shown in FIG. 2.

Subsequent to starting step 201, wheel speeds Nij are read in step 202. In step 203, a reference wheel is selected. To ensure as fast a detection as possible, in each case the slowest wheel outside an anti-lock control of the vehicle is selected. In this context, wheels having speed sensor errors, plausibility errors, parasitics, or stationary wheels are not considered in the selection of the slowest wheel. For this purpose, it is possible to use the safety logic generally existing in anti-lock control systems. Likewise, the panic braking detection is not activated if a rough road or speed bumps are detected where a wheel behavior similar to that during a panic braking operation can arise. In rough-road detection, it is likewise possible to use a rough-road detection generally existing in the anti-lock control system.

Alternatively or in addition to this, the speed selection can be limited to the non powered axle. In this manner, the influence of engine drag torque, in particular on roadways having a low coefficient of friction, is also ruled out.

In subsequent step 204, speed $N_b$ of the wheel selected according to the above procedure is derived as follows:

$$a_b = dN_b/dt$$

To compensate for slight wheel disturbances, it is possible for the thus acquired deceleration to be filtered via a first-order time-delay element. In this context, the filtering time parameter is applicable.

In step 205, the (possibly filtered) wheel acceleration $a_b$ is compared to threshold value SW1. In the braking event, value $a_b$ of the wheel acceleration is negative (wheel deceleration).

Threshold value SW1 (deceleration trigger threshold) is negative as well. If wheel acceleration $a_b$ does not fall below SW1, then one passes made to final step 211 since no significantly large wheel deceleration is present.

When deceleration trigger threshold SW1 (for example $-1$ m/s$^2$) is reached, that is when SW1 is undershot, then time meter $\Delta T$ is started in step 206.

If, within applicable time window $\Delta T$ (for example 50 ms, step 208), second threshold value SW$_2$ (for example $-3$ M/s$^2$) is undershot as well (step 207), then one passes to step 209. In step 208a, wheel acceleration $a_b$ is updated. If vehicle deceleration threshold SW2 (for example $-3$ m/s$^2$) is not reached or only after time window $\Delta T$ has elapsed (for example 50 ms), one passes to final step 211.

In step 209, additional conditions can be checked before a panic braking operation is detected in step 210. Thus, it is possible, for example, for additional plausibility checks to be carried out in step 209, for example, as to whether the brake lights switch (signal BLS) is actuated (driver is stepping on the brake) and/or whether the overall vehicle deceleration also becomes greater from program cycle to program cycle.

Figure 3:
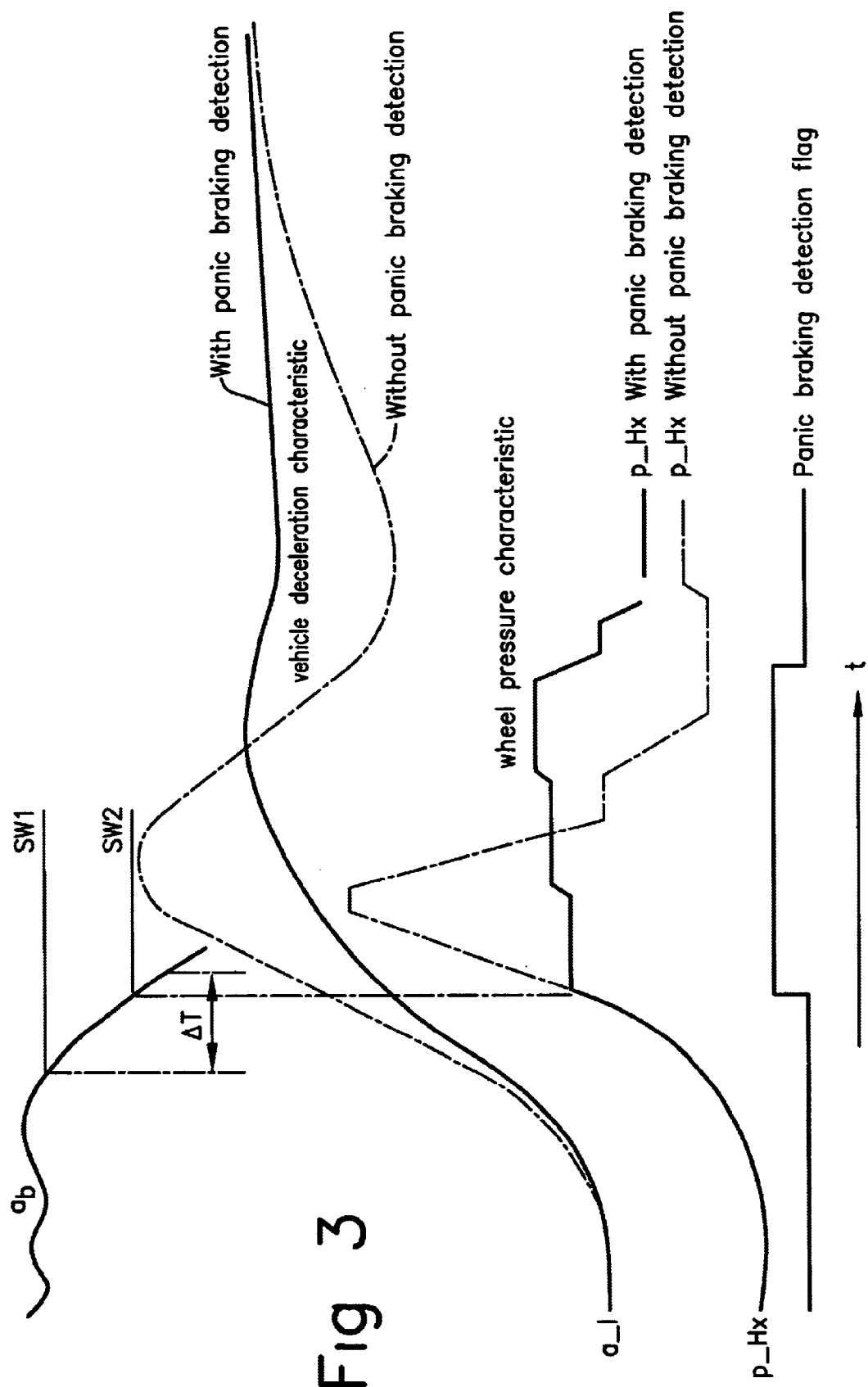
FIG. 3 shows time characteristics.

FIG. 3 exemplarily depicts the time characteristics of different quantities. Shown top left are, first of all, the profile of time-related change $a_b$ of the wheel speed of the reference wheel in the event of a panic braking operation as well as threshold values SW1 and SW2.

Also shown are the profile of vehicle deceleration a__1, brake pressure characteristic p_Hx at a rear-wheel brake with and without panic braking detection as well as the panic braking detection flag.

If value $a_b$ falls below threshold value SW2 within time $\Delta T$, then the panic braking detection flag is set (step 210).

If a panic braking operation is now detected in step 210, then an adjustable, for example very flat, series of pulses for limiting the rate-of-change of the wheel pressure (valve actuation ABS hydraulics) is started at the wheel brakes of the rear axle (see wheel pressure characteristic in FIG. 3). This rate-of-change limitation is executed until an ABS control and/or an EBD control (electric brake-power distribution) takes over the pressure modulation at the rear axle, or until a minimum vehicle deceleration (for example $-2$ m/s$^2$) is undershot or a maximum build-up time (for example 200 ms) is exceeded.

Furthermore, the panic braking operation can be indicated to the following traffic, for example, by activating the hazard warning system.

What is claimed is:
1. A method for detecting a panic braking operation of a vehicle having at least two wheels, comprising the steps of:
   a) measuring speed quantities that represent rotary motions of the at least two wheels;
   b) performing at least one of the steps of:
      b1) selecting one of the speed quantities corresponding to one of the at least two wheels, and
      b2) determining a speed value from the speed quantities;
   c) determining a change value representing a time-related change of at least one of the selected speed quantity and the speed value;
   d) determining a time characteristic of the change value;
   e) detecting a panic braking operation as a function of the time characteristic of the charge value;

f) comparing the change value to a first threshold value; and g) detecting the panic braking operation if the change value falls below a second threshold value within a specifiable first period of time subsequent to falling below the first threshold value, the first threshold value being greater than the second threshold value.

2. The method according to claim 1, wherein:
the speed value of one of the at least two wheels is selected such that at least one of the following occurs:
one of the speed quantities corresponding to one of the at least two wheels having a lowest rotational speed is selected as the selected speed quantity, and
the speed value is determined via a mean value generation from the speed quantities of the at least two wheels.

3. The method according to claim 1, wherein:
the vehicle includes an engine that drives at least one of the at least two wheels, and
only non driven wheels are used for at least one of the selecting the selected speed quantity and for determining the speed value.

4. The method according to claim 1, further comprising the steps of:
detecting a braking signal representing an actuation of a brake pedal of the vehicle that can be actuated by a driver; and
performing at least one of the steps of:
detecting the panic braking operation only if the braking signal indicates the actuation of the brake pedal, and
performing the steps of:
determining a deceleration quantity representing a deceleration of the vehicle, and
detecting the panic braking operation only if the deceleration quantity becomes greater over time.

5. A method for detecting a panic braking operation of a vehicle having at least two wheels, comprising:
a) measuring speed quantities that represent rotary motions of the at least two wheels;
b) performing at least one of the steps of:
b1) selecting one of the speed quantities corresponding to one of the at least two wheels, and
b2) determining a speed value from the speed quantities;
c) determining a change value representing a time-related change of at least one of the selected speed quantity and the speed value;
d) determining a time characteristic of the change value;
e) detecting a panic braking operation as a function of the time characteristic of the change value;
f) checking the speed quantities for errors; and
g) excluding those of the speed quantities corresponding to those of the at least two wheels at which an error has been detected from at least one of the selecting of the speed quantity and the determining of the speed value.

6. A method for detecting a panic braking operation of a vehicle having at least two wheels, comprising:
a) measuring speed quantities that represent rotary motions of the at least two wheels;
b) performing at least one of the steps of:
b1) selecting one of the speed quantities corresponding to one of the at least two wheels, and
b2) determining a speed value from the speed quantities;

c) determining a change value representing a time-related change of at least one of the selected speed quantity and the speed value;
d) determining a time charactieristic of the change value;
e) detecting a panic braking operation as a function of the time characteristic of the change value;
f) detecting whether the vehicle travels on a roadway having irregularities of a specifiable degree; and
g) deactivating the detecting of the panic braking operation when the vehicle is detected as traveling on the roadway having irregularities.

7. A method for detecting a panic braking operation of a vehicle having at least two wheels, comprising:
a) measuring speed quantities that represent rotary motions of the at least two wheels;
b) performing at least one of the steps of:
b1) selecting one of the speed quantities corresponding to one of the at least two wheels, and
b2) determining a speed value from the speed quantities;
c) determining a change value representing a time-related change of at least one of the selected speed quantity and the speed value;
d) determining a time characteristic of the change value; and
e) detecting a panic braking operation as a function of the time characteristic of the change value;
wherein, in response to a detection of the panic braking operation, performing:
e1) activating a hazard warning system provided in the vehicle, and
e2) limiting a brake pressure at rear wheels of the at least two wheels, wherein one of the following occurs:
e2.1) the limiting of the brake pressure is maintained until at least one of an anti-lock control and a braking-force distribution control is activated at the rear wheels,
e2.2) a specifiable second period of time is exceeded, and
e2.3) a specifiable minimum vehicle deceleration is undershot.

8. A device for detecting a panic braking operation of a vehicle having at least two wheels, comprising:
a) an arrangement for measuring speed quantities that represent rotary motions of the at least two wheels;
b) an arrangement including at least one of:
b1) an arrangement for selecting one of the speed quantities corresponding to one of the at least two wheels, and
b2) an arrangement for determining a speed value from the speed quantities;
c) an arrangement for determining a change value representing a time-related change of at least one of the selected speed quantity and the speed value;
d) an arrangement for determining a time characteristic of the change value;
e) an arrangement for detecting a panic braking operation as a function of the time characteristic of the change value;
f) and arrangement to compare the change value to a first threshold value; and
g) an arrangement to detect the panic braking operation if the change value falls below a second threshold value within a specifiable first period of time subsequent to falling below the first threshold value, the first threshold value being greater than the second threshold value.

9. The device according to claim 8, wherein:
the speed value of one of the at least two wheels is selected such that at least one of the following occurs:
one of the speed quantities corresponding to one of the at least two wheels having a lowest rotational speed is selected as the selected speed quantity, and
the speed value is determined via a mean value generation from the speed quantities of the at least two wheels.

10. A device for detecting a panic braking operation of a vehicle having at least two wheels, comprising:
a) an arrangement for measuring speed quantities that represent rotary motions of the at least two wheels;
b) an arrangement including at least one of:
b1) an arrangement for selecting one of the speed quantities corresponding to one of the at least two wheels, and
b2) an arrangement for determining a speed value from the speed quantities;
c) an arrangement for determining a change value representing a time-related change of at least one of the selected speed quantity and the speed value;
d) an arrangement for determining a time characteristic of the change value;
e) an arrangement for detecting a panic braking operation as a function of the time characteristic of the change value;
f) an arrangement for checking the speed quantities for errors; and
g) an arrangement for excluding those of the speed quantities corresponding to those of the at least two wheels at which an error has been detected from at least one of the selecting of the speed quantity and the determining of the speed value.

11. A method to detect a panic braking operation of a vehicle, the method comprising:
a) measuring a speed of at least one wheel;
b) determining a speed value in accordance with the speed of the at least one wheel;
c) determining a time-related change of the speed value;
d) comparing the time-related change to a first threshold value and to a second threshold value, the first threshold value being greater than the second threshold value; and
e) detecting the panic braking operation if the time-related change falls below the second threshold value within a specifiable first period of time after falling below the first threshold value.

12. The method according to claim 11, wherein the speed value is determined in accordance with a speed of a wheel having a lowest rotational speed.

13. The method according to claim 11, wherein the speed value is determined as a mean value of the speed of the at least one wheel.

14. The method according to claim 11, wherein the speed value is determined in accordance with a speed of at least one non driven wheel.

15. A method to detect a panic braking operation of a vehicle, the method comprising:
a) measuring a speed of at least one wheel;
b) determining a speed value in accordance with the speed of the at least one wheel;
c) determining a time-related change of the speed value;
d) comparing the time-related, change to a first threshold value and to a second threshold value, the first threshold value being greater than the second threshold value;
e) detecting the panic braking operation if the time-related change falls below the second threshold value within a specifiable first period of time after falling below the first threshold value;
f) checking the speed of the at least one wheel for errors; and
g) excluding a speed of those of the at least one wheel having the errors.

16. A method to detect a panic braking operation of a vehicle, the method comprising:
a) measuring a speed of at least one wheel;
b) determining a speed value in accordance with the speed of the at least one wheel;
c) determining a time-related change of the speed value;
d) comparing the time-related change to a first threshold value and to a second threshold value, the first threshold value being greater than the second threshold value;
e) detecting the panic braking operation if the time-related change falls below the second threshold value within a specifiable first period of time after falling below the first threshold value;
f) detecting whether the vehicle travels on a roadway having irregularities; and
g) deactivating the detecting of the panic braking operation if the vehicle travels on the roadway having the irregularities.

17. A device for detecting a panic braking operation of a vehicle, comprising:
a) means for measuring a speed of at least one wheel;
b) means for determining a speed value in accordance with the speed of the at least one wheel;
c) means for determining a time-related change of the speed value;
d) means for comparing the time-related change to a first threshold value and to a second threshold value, the first threshold value being greater than the second threshold value; and
e) means for detecting the panic braking operation if the time-related change falls below the second threshold value within a specifiable first period of time after falling below the first threshold value.

18. A device for detecting a panic braking operation of a vehicle, comprising:
a) means for measuring a speed of at least one wheel;
b) means for determining a speed value in accordance with the speed of the at least one wheel;
c) means for determining a time-related change of the speed value;
d) means for comparing the time-related change to a first threshold value and to a second threshold value, the first threshold value being greater than the second threshold value;
e) means for detecting the panic braking operation if the time-related change falls below the second threshold value within a specifiable first period of time after falling below the first threshold value;
f) means for checking the speed of the at least one wheel for errors; and
g) means for excluding a speed of those of the at least one wheel having the errors.

19. A device for detecting a panic braking operation of a vehicle, comprising:
- a) means for measuring a speed of at least one wheel;
- b) means for determining a speed value in accordance with the speed of the at least one wheel;
- c) means for determining a time-related change of the speed value;
- d) means for comparing the time-related change to a first threshold value and to a second threshold value, the first threshold value being greater than the second threshold value;
- e) means for detecting the panic braking operation if the time-related change falls below the second threshold value within a specifiable first period of time after falling below the first threshold value;
- f) means for detecting whether the vehicle travels on a roadway having irregularities; and
- g) means for deactivating the detecting of the panic braking operation if the vehicle travels on the roadway having the irregularities.

* * * * *